Oct. 24, 1939.    A. J. L. HUTCHINSON    2,177,068
PROCESS FOR TREATING GASES
Filed Dec. 3, 1938
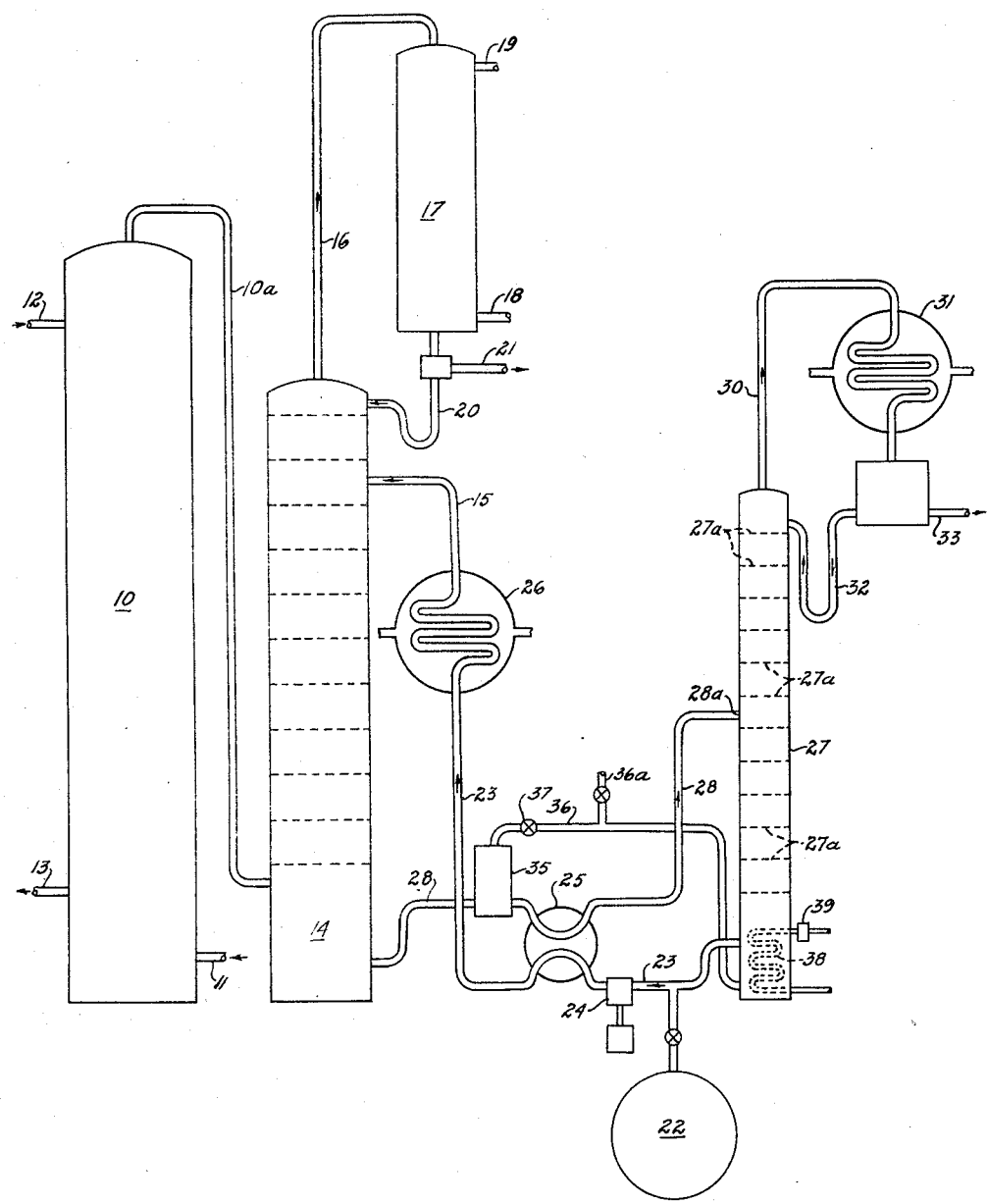
Inventor.
Arthur J. L. Hutchinson.
H. Calvin White
Attorney.

Patented Oct. 24, 1939

2,177,068

UNITED STATES PATENT OFFICE 2,177,068

PROCESS FOR TREATING GASES

Arthur J. L. Hutchinson, Kansas City, Mo., assignor, by direct and mesne assignments, of one-half to The Fluor Corporation, Ltd., Los Angeles, Calif., a corporation of California, and one-half to Lone Star Gas Company, Dallas, Tex., a corporation of Texas Application December 3, 1938, Serial No. 243,786

7 Claims. (Cl. 23—2)

This invention relates generally to an improved process for treating gaseous mixtures containing both moisture and acid gases, and more particularly for removing both moisture and acid gases, such as hydrogen sulphide, sulphur dioxide and carbon dioxide, in a single treatment of the gas mixture. One of the principal adaptations of the invention is for the simultaneous removal of moisture and acid gases from natural gas to condition it for distribution in pipe lines, and accordingly the invention will be described with reference to the treatment of natural gas as a typical, though not necessarily limitative, application of the process. The present application is a continuation in part of my application Serial Number 134,985, filed April 5, 1937, for Gas treating process.

Natural gas, after treatment by the usual absorption process for the removal of liquefiable hydrocarbons, normally contains considerable moisture and a substantial amount of acid gases, principally hydrogen sulphide and carbon dioxide. Where the gas is distributed under pressure in pipe lines, two difficulties are encountered. Water condenses out of the gas and accumulates in the pipes, particularly in localities where the atmospheric and ground temperatures are low, causing pipe corrosion and the formation of hydrates that materially reduce pipe line capacity, and in extreme cases completely plug the line. The acid gases, in addition to contaminating and reducing the heat value of the gas, also attack the pipes and cause further disintegration and corrosion of the lines as well as appliances and equipment to which the gas is supplied. My primary object is to provide an improved gas treating process involving the use of an absorbent which when brought into intimate contact with the gas, will remove acid gases to high degree of separation, and extract moisture to the extent that even under low temperature conditions in the pipe line, the moisture content of the gas will have been reduced well below the saturation or dewpoint.

According to the invention, the gas is treated by intimate contact with a combination of absorbents which preferably are in mutually soluble condition, one being very hygroscopic and the other having high affinity for acid gases such as hydrogen sulphide and carbon dioxide. Incidentally, it may be mentioned that the terms "absorbent" or "absorptive" as applied to either or both of the individual constituents of the liquid, are to be interpreted broadly as connoting capacity for removing acid gases or moisture, as the case may be, either by physical absorption or chemical reaction. In the preferred combination of absorbent liquids, one acts to remove moisture by physical absorption and the other to remove the acidic gases by chemical reaction therewith. Both however are regenerated, i. e., restored to normal condition, by heating in a cyclic operation.

I prefer to use as the moisture absorbent a suitable hygroscopic compound included in the general class of the liquid polybasic aliphatic alcohols, either with or without an ether group. The particular compounds within this general classification found to be especially suitable are the ethylene glycols, i. e., members of the ethylene glycol series including ethylene glycol, propylene glycol, diethylene glycol and triethylene glycol. While any suitable member of the series, or mixtures thereof, may be used, I prefer to employ diethylene glycol as the dehydrating agent for various practical reasons and because of its extreme hygroscopicity and low vapor pressure, the latter property permitting relatively large volumes of gas to be treated without material loss of the absorbent.

Suitable absorbents for the acid gases may be selected from the organic nitrogen compounds known as amines, and particularly the aliphatic amines in which the amino ($NH_2$) radical is attached to the methylene ($CH_3$) group, which in turn may be attached to one or more aliphatic or straight chain groups, saturated or unsaturated, or to a saturated or unsaturated ring, e. g. benzylamine. These amines include the primary, secondary and tertiary forms, as well as members of the mono-, di-, triamine series. Of the various aliphatic amines, those having a hydroxyl group i. e. alkylol amines are found to be highly satisfactory. They include monoethanolamine, diethanolamine, triethanolamine, and others of this group. It should be mentioned that the treatment of gases by an amine absorbent is in itself known, see Reissue Patent No. 18,958, issued September 26, 1933, to R. R. Bottoms, on Process for separating acidic gases. However, the advantages of combining in a single absorption medium, mutually soluble acidic gas and moisture absorbents of the type contemplated by the invention, the effects had by one upon the action and properties of the other, and the advantageous properties of the solution in its absorptive action upon the moisture and acidic constituents of the gas, have not previously been known.

In addition to its capacity for removing both acid gases and moisture to a high degree of separation from the gas being treated, a solution of an amine and a liquid polybasic aliphatic alcohol, for example triethanolamine and diethylene glycol, possesses other distinct advantages over absorbents containing but one of these materials, and therefore over a process whereby the gas might be treated by one and then by the other of the materials. These advantages can best be explained by first outlining the general steps of the process.

The absorbent used in the process may comprise, typically, a mixture of diethylene glycol, triethanolamine and water. The percentages of the constituents may be varied to best suit the conditions in any particular plant and in accordance with the type and composition of the gas being treated. Ordinarily the percentage of glycol will be substantially in excess of the percentage of amine. For example, the composition of the absorbent may be substantially 80% diethylene glycol, 15% triethanolamine and 5% water. An absorbent of this composition will remove the acid gases and give the treated gas a dewpoint around 75° F. below the temperature of the absorbent. For other depressions of the dewpoint, the ratio of water to glycol may be changed, maintaining the concentration of the amine constant, or the concentration of all three constituents, glycol, amine and water, may be varied as best suits the particular conditions under which the process is being operated, but always maintaining the glycol in excess of the amine. After treatment of the gas, the absorbent liquid is subjected to heating in a suitable manner that will remove substantially all the acidic gases, and remove absorbed moisture from the glycol, although some water, usually around 5%, or more, is left in the absorbent liquid to be returned to the gas treating chamber or absorber.

It is desirable that the amine be heated to a temperature sufficiently high to effect substantially complete regeneration. The present absorbent has the advantage over the simple water and amine mixtures heretofore used, in that the boiling point of the solution of the amine in the glycol is increased to the extent of permitting substantially more complete regeneration of the amine. On the other hand, the presence of the amine serves to chemically stabilize the glycol, preventing it from decomposing due to repeated heating and cooling, to the extent that decomposition would occur at corresponding temperatures in the absence of the amine. By chemically stabilizing the glycol, corrosion is reduced, since the decomposition products of the glycol are acid and corrosive. The mixture will have a lower viscosity than the glycol alone, permitting higher rates of heat exchange, more intimate contact between the gas and liquid in the absorber, and a reduction of foaming tendencies. The decreased viscosity of the absorbent contributes to greater heat economy in the system as a whole, by reason of higher heat exchange rates in the still and increased transference of heat from the denuded to the enriched mixture. A further advantage is gained respecting the vapor pressure characteristics of the absorbent, in that the vapor pressures of the mutually soluble components are, individually, lowered below their normal vapor pressures.

Commercial operation of the process has demonstrated its exceptional efficiency for the removal and separation of both acid gases and moisture from natural gas. In fact, the efficiency of the invention in these respects exceeds that of any known process of which I am aware. Speaking first of acid gas removal, it is known that an aqueous solution of an organic amine can be used for the removal of an acidic constituent from the gas, and that the absorbed acid gas can be removed from the amine solution by boiling the solution. In practice it is found that continued boiling of the foul amine solution containing the absorbed acid gas is necessary to substantially completely free the solution of the acid gas. In the present process, removal of the absorbed acid gas from the amine solution is greatly facilitated by reason of the presence of the polyhydric alcohol, in that the alcohol makes possible the separation of the absorbed acid gas with very slight boiling of the solution. Separation of the absorbed acid gas from the solution is practically complete even after slight boiling, where the solution contains a substantial concentration of a polyhydric alcohol. Therefore, the vapor pressure of the absorbed acid gas over the regenerated amine solution in the absorber is negligible. This enables the regenerated solution to reduce the concentration of the acid gas in the purified gas leaving the absorber to an unusually low value, thereby improving the efficiency of the absorption stage.

On the other hand, as to moisture removal, it is found that the presence of the amine greatly enhances the capacity of the polyhydric alcohol for dehydration. It is known that a polyhydric alcohol having a low vapor pressure may be used for the partial removal of water vapor from gas, but the completeness of dehydration of the gas is dependent on the hygrospicity of the polyhydric alcohol and on the concentration of water in the alcohol solution. I have found that the addition of an amine to the polyhydric alcohol solution will greatly increase the dehydration efficiency of the solution, even when the addition of the amine is accompanied by an increase in the water concentration of the solution.

The reasons and principles underlying the action and efficiency of the glycol-amine-water solution are believed explicable by the following considerations and reactions. The reduction in dewpoint of the gas beyond that expected, apparently is due to the chemical reaction of the amine and water and then the suppression of ionization of the base so formed, so that the effective water in the solution is thereby greatly reduced. The amine reacts with water according to the following equation:

in the equation "R" represents an aliphatic or other corresponding group, as previously mentioned with reference to the classes of amines contemplated, and although a mono-amine is represented in the equation it will be understood that the same general reaction applies whether a mono-, di- or triamine is used.

Normally this equation represents a reversible reaction and very little change of water vapor pressure could be expected where there is a relatively large amount of water with respect to the amine. Where, in the present process, there is a relatively large amount of solution made up of water and a glycol with a relatively small amount of amine, the amine reacts with a certain amount of water present to form the organic base, but due to the presence of the glycol the ionization of this base is suppressed, so that in effect, the amine-water reaction progresses only in the right hand direction.

Likewise, the low hydrogen sulphide content of the residue gas is explicable on the basis of suppression of ionization of the amine-hydrogen sulphide compound by the presence of the glycol. The normal equation for the reaction between the amine base and hydrogen sulphide is as follows:

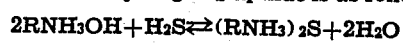

Normally, this again is a reversible reaction so that even with a small amount of hydrogen sulphide adsorbed by the amine the solution would have an appreciable hydrogen sulphide vapor pressure. Suppression of ionization of the reaction product by the glycol again permits the reaction to progress only in the right hand direction, and as a result the hydrogen sulphide vapor pressure of the un-ionized amine-hydrogen sulphide compound is exceedingly low.

Since it is not possible to say with certainty that the above theoretical explanation represents the actual reactions, an alternative theory may also be suggested.

It is quite possible that the amine reacts with water and carbon dioxide to form a carbonate, and that the latter reacts with hydrogen sulphide to form a bicarbonate and an acid sulphide. These reactions may be represented by the following equations:

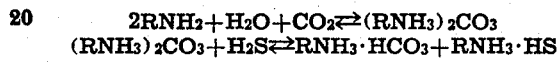

Both of the above reactions take place in the right hand direction at relatively low temperatures and they reverse under conditions of relatively high temperatures.

The advantages of the glycol-amine-water solution, and the effects and influences of each constituent upon the other, are manifest in the regeneration stage of the process, as well as in the absorption stage. It has been found that by virtue of the high concentration of glycol in the solution, the hydrogen sulphide and carbon dioxide are freed from the amine to a far greater extent than in, for example, an amine-water solution alone. Therefore, the heat requirements in regenerating the solution are only a fraction of the heat required for regeneration of an amine-water solution. From all data available, it is indicated that regeneration of the amine-glycol-water solution even with a comparatively low heat input, is far more complete than that resulting from almost any amount of boiling of an amine-water solution. Due to the presence of the amine and the absorbed acid gases, the temperature required to dehydrate the solution to the desired point is greatly reduced. This point is of importance in that the loss of solution by entrainment from the top of the reactivating still is reduced, and the thermal decomposition of the chemicals diminishes to an infinitesimally small amount.

The invention will be more fully understood by supplementing the foregoing explanation with a description of a typical method and form of apparatus for carrying out the process. Reference is made to the accompanying drawing illustrating the system diagrammatically and in flow sheet form.

In the drawing, numeral 10 indicates a typical absorber supplied with gas coming from the well through line 11, and within which the gas is depleted of its heavier and less volatile constituents by absorption of the latter in a relatively heavy oil introduced through line 12 and discharged at the base of the absorber through outlet 13. The stripped gas leaving the main absorber 10 is passed through line 10ª into the base of the moisture and acid gas absorber 14, which, as will be understood, may be of any suitable type and construction capable of effecting intimate contact between the rising gas stream and the downwardly flowing liquid dehydrating and acid gas removal agent (amine-glycol-water mixture) being introduced into the upper interior of the absorber through line 15. The treated gas leaving the absorber through outlet 16 may be passed through a suitable condenser 17 through which a suitable cooling medium is circulated via lines 18 and 19, to remove condensible constituents of the absorbent that may be carried by the outlet gas. Any condensate formed is returned to the absorber through line 20 and the treated gas is taken through line 21 to the gas distributing main. As previously mentioned, the gas ordinarily will be maintained under substantial pressure during its passage through the absorber, as well as in the pipe lines to which the gas is delivered.

The glycol and amine may be supplied to the system from a suitable storage tank 22 and introduced to line 23 within which the absorbent is forced by pump 24 through heat exchanger 25 and cooler 26 to the absorber 14. Heat exchanger 25 is utilized to effect preliminary cooling of the denuded absorbent coming from still 27, by heat transference to the enriched absorbent being circulated from the base of the absorber through line 28 to the still. In cooler 26, the temperature of the absorbent flowing through line 23 is further and finally reduced to increase the absorptive capacity and efficiency of the absorbent mixture, in accordance with conditions existing in the absorber. The enriched absorbent taken from the base of absorber 14 may be passed into a vent tank 35 located in line 28 between the absorber and heat exchanger 25 and maintained at any suitable pressure less than the absorber pressure. The vent tank permits liberation of all entrained gases and most of the dissolved gases, thereby materially reducing the vapor load on the still 27, and permitting higher recovery of the absorbent chemicals and lower still temperatures. The liberated gases may be released from the vent tank through line 36, which may contain a pressure control valve 37 set to maintain the desired pressure in the vent tank, and then discharged to the atmosphere through line 36ª or passed through 36 into the base of the still 27. This latter expedient may be desirable particularly where the acid gas absorbed by the solution is comparatively low, for the purpose of utilizing the partial pressure of the vented vapor and gas to aid in stripping the absorbent in the still and reducing the required temperature of regeneration of both the amine and glycol. As will be understood, the absorbent leaving the vent tank may be pumped or forced by the absorber pressure through the heat exchanger 25 into the still.

In flowing downwardly through the absorber 14, the liquid absorbs the acid gases and mixture from the natural gas, the percentage of gas or moisture extraction being controllable by regulation of the several variables, temperature, absorbent-to-gas ratio, and the composition of the absorbent. The enriched absorbent leaving the base of the absorber through line 28 is passed to a suitable still 27 wherein it is heated to a temperature at which regeneration of the amine and removal of the acid gases will occur, and to a temperature at which the water content of the absorbent is reduced to a predetermined desired point, say about 5% by volume of the absorbent. The absorbent, depleted of the acid gases and moisture to the desired extent, then leaves the base of the still through outlet 23 to be returned to the absorber, and the removed water vapor reflux and acid gases are discharged through line 30 to a suitable cooler 31. Uncondensed vapors and gases are sent to disposal through line 33.

If for the purpose of aiding regeneration of the amine, or for any other reason, it is desirable to supply to the still 27 additional water as reflux, the water reflux may be returned from the final condenser 31 via line 32 and passed downwardly over a sufficient number of plates 27a in the still above the absorbent inlet 28a. When used, the water reflux serves the dual purpose of preventing the loss of chemicals and supplying sufficient steam for regeneration of the amine. As will later appear, it has been found unnecessary in the operation of at least some plants, to utilize water reflux in the still. The extent to which the absorbent is dehydrated may be controlled by regulation of the temperature within the base of the still. For this purpose, the base of the still may contain a coil 38 supplied with steam under control of a thermostat 39 operating to maintain a predetermined maximum temperature to which the absorbent is heated. If desired, the still may be operated at subatmospheric pressure, thereby reducing the required temperature at the base of the still and permitting the use of less stable absorbent chemicals, in view of the lower temperatures required for distillation under reduced pressure.

In the commercial operation of the system it has been found desirable to maintain the amine concentration at from 2% to 20% by volume of the total solution. The concentration of glycol in the solution preferably will range from 50% to 90% by volume, and the concentration of water from 2% to 30% by volume. The amount of solution required for purification of the gas is of course dependent on the concentration of impurities in the raw gas and on the pressure and temperature in the absorber, as well as the concentration of the amine in the solution. It has been found from operation of a plant treating as much as forty million cubic feet of gas per day, that natural gas containing one-tenth of one per cent. of carbon dioxide by volume, fifty grains of hydrogen sulphide per 100 cubic feet and saturated with water vapor at 60 degrees Fahrenheit, can be effectively treated under a pressure of 400 pounds per square inch gauge and at a temperature of 60 degrees Fahrenheit, by the circulation of from one to one and one-half gallons of solution, containing 8 per cent. of monoethanolamine, 75 per cent. of diethylene glycol, and 17 per cent. of water, all by volume, per thousand cubic feet of gas treated.

The dewpoint of natural gas saturated with water vapor at 60 degrees Fahrenheit and at 400 pounds per square inch gauge pressure, may be reduced readily to a dewpoint of zero degrees Fahrenheit. Simultaneously, the hydrogen sulphide content of the purified gas has been reduced to approximately one-tenth of one grain per hundred cubic feet, at times when the concentration of hydrogen sulphide in the raw gas approximated fifty grains per hundred cubic feet.

Results obtained in different twenty-four hour plant runs on commercial scale are shown in the following table:

Table I

|  | Run 1 | Run 2 | Run 3 | Run 4 |
|---|---|---|---|---|
| Gas rate (cu. ft./day) | 9,600,000 | 10,200,000 | 23,700,000 | 5,400,000 |
| Liquor rate (gal/min.) | 13 | 22 | 14 | 1.0 |
| Percent diethylene glycol | 79.7 | 77.2 | 79.5 | 65.5 |
| Percent monoethanolamine | 8.1 | 6.8 | 8.1 | 7.5 |
| Percent water | 12.2 | 16.0 | 12.4 | 17.0 |
| Volume $CO_2$/volume solution entering still | 10.5 | 6.65 | 12.18 | 10.89 |
| Volume $CO_2$/volume solution leaving still | 0.5 | 0.69 | 0.46 | 0.66 |
| Volume $H_2S$/volume solution entering still | 1.21 | 1.36 | 0.032 | 0.318 |
| Volume $H_2S$/volume solution leaving still | Nil | 0.15 | 0.013 | 0.0063 |
| Residual $CO_2$—Percent of initial $CO_2$ (i. e. percentage remaining in absorbent) | 4.8 | 10.4 | 3.8 | 6.1 |

The above figures show liquor concentrations as percent by volume, and show acid gas volumes as volumes of gas contained in one volume of solution. The reactivation still in the plant from which these data were obtained was constructed as herein described and operated without returning reflux to the still and with a reboiler (still) temperature ranging from 250° F. to 260° F. The following figures show comparable operation of a plant using an aqueous solution of approximately 30% of monoethanolamine without glycol and were in part obtained and in part calculated from information contained in volume 29, Journal Industrial and Engineering Chemistry, pages 514-519 and more particularly from Table 6 in that article:

Table II

|  | Run 1 | Run 2 | Run 3 | Run 4 |
|---|---|---|---|---|
| Amine concentration, percent by volume | 30.2 | 35.4 | 31.6 | 29.6 |
| Reboiler temperature °F. | 229 | 232 | 235 | 222 |
| Cu. ft. $CO_2$/gal. solution entering still | 5.5 | 7.8 | 7.3 | 6.3 |
| Cu. ft. $CO_2$/gal. solution leaving still | 3.0 | 3.2 | 2.1 | 1.6 |
| Volume $CO_2$/volume solution entering still | 41.0 | 58.2 | 54.5 | 47.0 |
| Volume $CO_2$/volume solution leaving still | 22.4 | 23.9 | 15.7 | 11.9 |
| Residual $CO_2$—Percent of initial $CO_2$—(i. e. percentage remaining in absorbent) | 54.6 | 41.0 | 28.7 | 25.4 |

A comparison of the above data in Tables I and II shows that from 25% to 55% of the absorbed carbon dioxide remains in the stripped solution when no polyhydric alcohol is present, whereas only from 3.8% to 10.4% of the absorbed carbon dioxide remains in the stripped solution when diethylene glycol is added to the amine solution, even though the initial concentrations of carbon dioxide in the amine-glycol solutions are much lower than corresponding concentrations in the amine-water solutions shown above. Furthermore, the volume of $CO_2$ per volume of solution leaving the still, as shown in Table II, ranges from 11.9 to 23.9, whereas in Table I this volume ranges from 0.46 to 0.69. This fact increases the utility of the process by reducing the amount of circulating solution required and also by reducing the concentration of acid gases remaining in the gas after treatment.

Results of plant operation have shown that the glycol-amine solution will result in much lower dewpoint in the treated gas than can be obtained by the use of glycol alone under similar conditions. The following plant operating data are illustrative:

Table III

|  |  | Without amine | With amine |
|---|---|---|---|
| Diethylene glycol | Percent by volume | 91.3 | 78.0 |
| Monoethanolamine | do | 0.0 | 8.0 |
| Water | do | 8.7 | 14.0 |
| Reboiler (still) temperature | °F | 300 | 260 |
| Inlet gas—dewpoint | °F | 63 | 60 |
| Outlet gas—dewpoint | °F | 18 | 0 |

It will be understood that the drawing is to be regarded merely as illustrative of a typical system and apparatus for carrying out the invention, and that various changes and modifications in the showing may be made without departing from the invention in its intended spirit and scope.

I claim:

1. The process of purifying a gas containing water vapor and acidic gases of the group consisting of hydrogen sulphide and carbon dioxide, as impurities, that includes contacting said gas with an absorbent that is composed of a liquid polyhydric alcohol, an aliphatic amine, and water, the amount of polyhydric alcohol being substantially in excess of the amount of aliphatic amine, and regenerating the fouled absorbent by heating it sufficiently to separate the absorbed water vapor and acidic gases therefrom.

2. The process of purifying a gas containing water vapor and acidic gases of the group consisting of hydrogen sulphide and carbon dioxide, as impurities, that includes contacting said gas with an absorbent that is composed of a polyhydric alcohol, an aliphatic amine, and water, the amount of polyhydric alcohol being at least twice the amount of aliphatic amine, and regenerating the fouled absorbent by heating it sufficiently to separate the absorbed water vapor and acidic gases therefrom.

3. The process of purifying a gas containing water vapor and acidic gases of the group consisting of hydrogen sulphide and carbon dioxide, as impurities, that includes contacting said gas with a solution containing a base formed by the reaction of an aliphatic amine and water, and a polyhydric alcohol, the proportion of the aliphatic amine being from 2 to 20%, the proportion of the polyhydric alcohol being from 50 to 90%, and the proportion of the water being from 2 to 30%, and regenerating the fouled solution by heating it sufficiently to substantially completely separate the absorbed hydrogen sulphide, carbon dioxide, and water vapor therefrom.

4. The process of purifying a gas containing water vapor and acidic gases of the group consisting of hydrogen sulphide and carbon dioxide, as impurities, that includes contacting said gas with an absorbent that is composed of diethylene glycol, monoethanolamine, and water, the amount of diethylene glycol being substantially in excess of the amount of monoethanolamine, and regenerating the fouled absorbent by heating it sufficiently to separate the absorbed water vapor and acidic gases therefrom.

5. The process of purifying a gas containing water vapor and acidic gases of the group consisting of hydrogen sulphide and carbon dioxide, as impurities, that includes contacting said gas with an absorbent that is composed of an ethylene glycol, an alkylol amine, and water, the amount of the ethylene glycol being substantially in excess of the amount of the alkylol amine, and regenerating the fouled absorbent by heating it sufficiently to substantially completely separate the absorbed hydrogen sulphide, carbon dioxide, and water vapor therefrom.

6. The process of purifying a gas containing water vapor and acidic gases of the group consisting of hydrogen sulphide and carbon dioxide, as impurities, that includes contacting said gas with a solution containing a base formed by the reaction of an alkylol amine and water, and an ethylene glycol, the proportion of the alkylol amine being from 2 to 20%, the proportion of the ethylene glycol being from 50 to 90%, and the proportion of the water being from 2 to 30%, and regenerating the fouled absorbent by heating it sufficiently to substantially completely separate the absorbed hydrogen sulphide, carbon dioxide, and water vapor therefrom.

7. The process of purifying a gas containing water vapor and acidic gases of the group consisting of hydrogen sulphide and carbon dioxide, as impurities, that includes contacting said gas with a solution containing a base formed by the reaction of an ethanolamine and water, and an ethylene glycol, the proportion of the ethanolamine being from 2 to 20%, the proportion of the ethylene glycol being from 50 to 90%, and the proportion of the water being from 2 to 30%, and regenerating the fouled absorbent by heating it sufficiently to substantially completely separate the absorbed hydrogen sulphide, carbon dioxide, and water vapor therefrom.

ARTHUR J. L. HUTCHINSON.